United States Patent [19]

Yean et al.

[11] Patent Number: 5,095,079
[45] Date of Patent: Mar. 10, 1992

[54] METHOD AND DEVICE FOR PRODUCING A GRADED INDEX POLYMER

[75] Inventors: Leanirith Yean, Longjumeau; Georges Wajs, Ivry; Gérard Martin, Antony; Patrick Guerrero, Lorrez le Bocage, all of France

[73] Assignee: Essilor International Cie Generale d'Optique, Creteil Cedex, France

[21] Appl. No.: 543,373

[22] Filed: Jun. 26, 1990

[30] Foreign Application Priority Data

Jul. 7, 1989 [FR] France .................... 89 09193

[51] Int. Cl.$^5$ .................... C08F 2/02
[52] U.S. Cl. .................... 526/60; 526/68; 526/87; 526/242; 526/314; 526/227; 525/263; 525/276; 525/277
[58] Field of Search .............. 526/60, 242, 314, 230.5, 526/68, 87, 227; 525/51, 276, 277, 263; 350/413

[56] References Cited

U.S. PATENT DOCUMENTS

| 3,816,160 | 6/1974 | Moore | 350/413 X |
|---|---|---|---|
| 3,955,015 | 5/1976 | Ohtsuka et al. | 427/163 |
| 4,022,855 | 5/1977 | Hamblen | 350/413 X |
| 4,686,266 | 8/1987 | Tang | 526/193 |
| 4,758,071 | 7/1988 | McLaughlin | 350/413 |
| 4,784,478 | 11/1988 | Takada | 350/413 |
| 4,944,584 | 7/1990 | Maeda | 351/172 |

FOREIGN PATENT DOCUMENTS

| 2600174 | 12/1987 | France . |
|---|---|---|
| 60-162610 | 8/1985 | Japan . |
| 60-175009 | 9/1985 | Japan . |
| 60-200838 | 10/1985 | Japan . |

Primary Examiner—Joseph L. Schofer
Assistant Examiner—M. Nagumo
Attorney, Agent, or Firm—Longacre & White

[57] ABSTRACT

To produce a graded index polymer there is diffused into a base material formed of at least one partly polymerized monomer adapted to yield a homopolymer with refractive index N1 in the gel state an additive material formed of at least one monomer adapted to yield a homopolymer with refractive index N2 different from N1. The polymerization of the base material treated in this way is then completed. The additive material comprises a mixture of at least two monomers and the composition of this mixture is varied with time.

10 Claims, 2 Drawing Sheets

METHOD AND DEVICE FOR PRODUCING A GRADED INDEX POLYMER

BACKGROUND OF THE INVENTION

1. Field of the Invention

The present invention is generally concerned with producing an optical quality plastics material element in which the refractive index varies continuously in at least one direction.

It is more particularly, but not necessarily exclusively directed to the case where the synthetic material element is adapted to be used to produce an ophthalmic lens.

2. Description of the Prior Art

It is known that varying the refractive index within an ophthalmic lens makes it possible, for the same degree of correction, to reduce the maximum thickness and therefore the weight, for example, to the benefit of user comfort.

It is also known that at present only polymerization techniques can obtain an index gradient over a distance sufficient to meet the requirements of ophthalmic optics.

At present, however, these techniques do not allow sufficient control over the index gradient.

In particular, they do not allow a specific index gradient profile to be obtained that is variable at will but reliably reproducible.

Japanese patent application No 60-200.838, for example, describes the use as the base material of a mixture of two monomers of sufficiently different molecular weight and yielding homopolymers with different refractive indexes; a certain radial distribution of mass is achieved in these monomers by centrifuging and then fixed by polymerization.

Apart from the fact that a process of this kind is relatively difficult to use it does not enable a sufficiently accurate specific index gradient profile to be obtained and can only produce an index gradient in a radial direction relative to the axis of the synthetic material element obtained; in practise it is at best suitable only for making relatively small synthetic material elements.

Japanese patent application No 60-162.610 also proposes the use as the starting material of a mixture of at least two monomers yielding homopolymers with different refractive indexes, the latter being chosen to have different reaction speeds and the mixture being subjected to a gravitational field able to modify their distribution as polymerization proceeds.

This process is also difficult to control accurately.

Finally, Japanese patent application No 60-175.009 proposes the use of diffusion.

To be more precise Japanese patent application No 60-175.009 proposes to diffuse into a base material formed of at least one partially polymerized monomer able to yield a homopolymer with refractive index N1 in the gel state an additive material itself formed of at least one monomer able to yield a homopolymer with refractive index N2 different from N1 and then to finish the base material treated in this way.

With a process of this kind it appears difficult, if not impossible, in practise to operate on the parameters such as the temperature and the state of the gel likely to influence the polymerization and therefore to impose on the diffusion profile the variations needed to obtain the required refractive index profile of the synthetic material element finally obtained.

A general object of the present invention is an arrangement using a diffusion process to obtain accurately, reliably and reproducibly a given index gradient profile.

SUMMARY OF THE INVENTION

In one aspect the present invention consists in a method for producing a graded index polymer in which there is diffused into a base material formed of at least one partly polymerized monomer adapted to yield a homopolymer with refractive index N1 in the gel state an additive material formed of at least one monomer adapted to yield a homopolymer with refractive index N2 different from N1 and the polymerization of the base material treated in this way is then completed, the additive material comprising a mixture of at least two monomers and the composition of this mixture being varied with time. In another aspect it consists in a device for implementing this method.

Thus in accordance with the invention mastery of the required index gradient profile is achieved by controlling appropriately the composition of the additive material instilled by diffusion into the base material to be treated and the subsequent polymerization of the latter serves to fix in the polymer state the configuration resulting from such diffusion.

For the final index gradient profile obtained to be that required it is sufficient in practise to provide modelling curves based on diffusion equations corresponding to the monomers constituting the diffusing additive material which give, for example, the required evolution with time of the concentration of one or both monomers.

The characteristics and advantages of the invention will emerge from the following description given by way of example with reference to the appended diagrammatic drawings

DETAILED DESCRIPTION OF THE INVENTION

The overall problem is to diffuse in a controlled way into a base material 10 formed of at least one partly polymerized monomer able to yield a homopolymer with refractive index N1 in the gel state an additive material 11 formed of at least one monomer able to yield a homopolymer with refractive index N2 different from N1 and then to complete polymerization of the base material 10 treated in this way.

Figure 1:
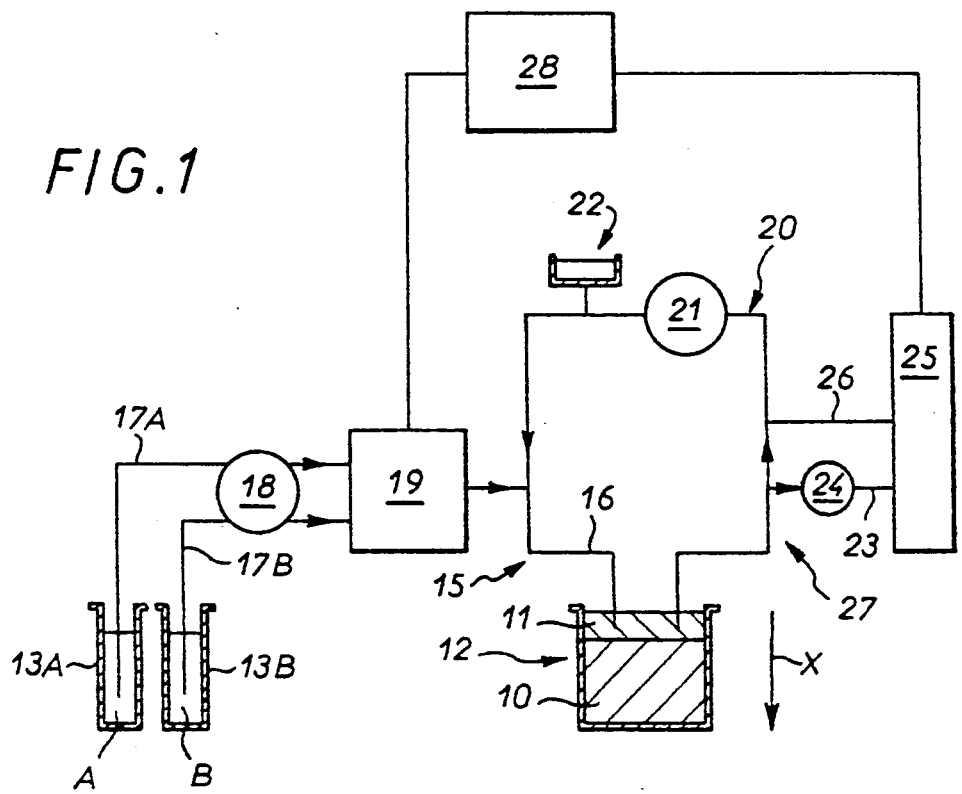
FIG. 1 is a block diagram of a device for implementing the invention.

In the embodiment shown in FIG. 1 the base material 10 is placed in a container 12 adapted to constitute a mold for it, for example, and the additive material 11 is poured onto the base material 10.

As shown the base material 10 is in the gel state.

As is known, a polymer gel is obtained by limiting its polymerization to a certain degree of advance and comprises two phases, a liquid phase made up of a solution of non-cross-linked chains in a solution of the initial monomer(s) and a solid phase formed by cross-linked chains (polymers or oligomers) of the initial monomer(s).

As is also known, when a diffusing additive material 11 is brought into contact with a gel of this kind three kinds of phenomena are observed.

Firstly, diffusion of the diffusing additive material 11 into the gel.

Conjointly, reverse diffusion towards the diffusing additive material 11 of the non-cross-linked chains and the initial monomer(s) that the gel contains.

Finally, there may be interaction between the diffusing additive material 11 and the aggregate cross-linked chains.

In practise the instantaneous local composition of the gel constituting the base material 10 and therefore the profile at the time in question depend on:
  the composition of the diffusing additive material 11,
  the degree to which polymerization has advanced,
  the diffusion coefficient of each constituent of the diffusing additive material 11, this coefficient varying in particular with the chemical nature and concentration of these constituents and temperature,
  parameters of thermodynamic interaction between the diffusing additive material 11 and the base material 10, in turn dependent on the preceding parameters.

In accordance with the invention the diffusing additive material 11 is a mixture of at least two monomers A, B and the composition of this mixture is varied with time.

In practise the composition is varied in accordance with a predetermined law chosen to yield the required graded index profile in the synthetic material element finally obtained.

For example, and as shown, the two monomers A, B constituting the diffusing additive material 11 are initially disposed in separate containers 13A, 13B. With the container 12 containing the base material to be treated are associated injection means 15 adapted to introduce into it in a controlled way one or both of the monomers A, B.

In the embodiment shown the injection means 15 comprise, in addition to a tube 16 which dips into the container 12, two tubes 17A, 17B respectively immersed in the containers 13A, 13B feeding in parallel by means of a pump 18 a solenoid valve 19 feeding the tube 16.

To ensure that the diffusing additive material 11 is homogeneous it is circulated through a loop 20 by a pump 21 with a branch connection to a container 22 for pressurizing the system, of which the tube 16 forms part in the embodiment shown.

In accordance with the invention the composition of the diffusing additive material 11 is monitored by measuring its refractive index.

In the embodiment shown a tube 23 branched off the circulation loop 20 for this purpose and equipped with a pump 24 diverts to a refractometer 25 the quantities of diffusing additive material 11 needed for the measurements to be taken, which are returned by a tube 26.

Thus in this embodiment the loop 20 constitutes sampling means 27 associated with the container 12 and adapted to remove therefrom some of the diffusing additive material 11 for testing in the refractometer 25.

Finally, in this embodiment a programmer 28 is provided for slaving the solenoid valve 19 to the refractometer 25.

The base material 10 is preferably a single monomer.

For example, it is diethylene glycol bis allyl carbonate (CAD) the homopolymer of which has a refractive index of 1.5 and the initial partial polymerization of which can be achieved by free radical polymerization using an initiator such as diisopropyl peroxycarbonate (PIP) or tert-butyl 2-peroxyethylhexanoate (TPE) The diffusing additive material 11 is preferably a mixture formed from the base material 10, that is to say in this instance the single monomer constituting the latter, and at least one separate monomer.

In other words, one of the monomers A, B constituting the diffusing additive material 11, for example the monomer A, is identical to that constituting the base material N, in this instance the CAD.

The other monomer B is preferably chosen to yield a homopolymer with a lower refractive index than the homopolymer corresponding to the CAD and to achieve sufficient reactivity relative to the latter.

It may be 2,2,2-trifluoroethane allylcarbonate (or CAF) for example.

A monomer of this kind can be synthesized by reacting 2,2,2-trifluoroethanol with allyl chloroformate in ethyl ether in the presence of an aqueous soda solution.

The refractive index of the homopolymer corresponding to the CAF is equal to 1.415.

Various examples of implementation of the invention will now be given.

EXAMPLE 1

The initial partial polymerization of the CAD constituting the base material 10 by free radical polymerization in the presence of 3% by weight of PIP is carried out at 48° C. for one hour 30 minutes.

It yields a gel comprising approximately 15% oligomer and 75% initial monomer

As shown in FIG. 1 the diffusing additive material 11 is introduced above this gel.

It is a 50/50 mixture by volume of CAD and CAF.

For this purpose the pump 18 and the solenoid valve 19 operate conjointly on the container 13A and the container 13B turn and turn about The pump 21 homogenizes the mixture.

Diffusion takes place axially, from the top level of the base material 10 to the bottom of the container 12, as schematically represented by the arrow X in FIG. 1.

It is continued for 96 hours at 20° C.

In accordance with the invention the composition of the diffusing additive material 11 is modified during diffusion.

In practise CAD is progressively injected into the diffusing additive material 11 by the pump 18 and the solenoid valve 19.

This results in a progressive lowering of the CAF concentration in the latter material.

Figure 2:
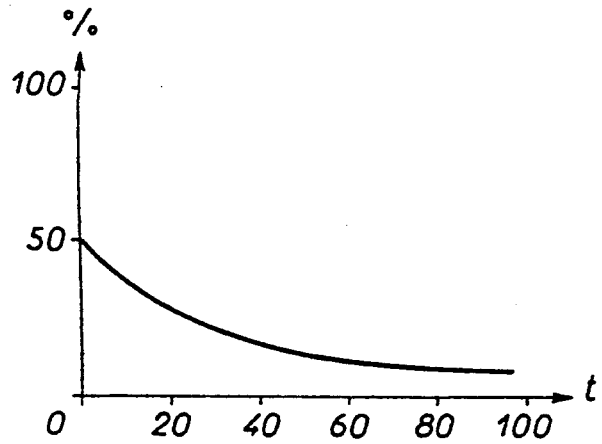
FIG. 2 is a diagram illustrating with reference to one embodiment of the invention the evolution with time of the concentration to be used for one of the constituent monomers of the diffusing additive material used in accordance with the invention.

FIG. 2 is a diagram showing by way of example the percentage evolution of the CAF concentration as a function of the time t in hours.

To obtain a given index gradient profile for the final synthetic material element obtained it is sufficient to use with a specific evolution with time of the CAF concentration.

This CAF concentration conditions the instantaneous refractive index of the diffusing additive material 11.

The refractometer 25 is therefore used to measure at regular intervals the refractive index at the diffusing additive material 11.

It is then sufficient to control the solenoid valve 19 as necessary.

It is in practise the programmer 28 which applies the necessary control on the basis of previously established modelling curves.

Figure 3:
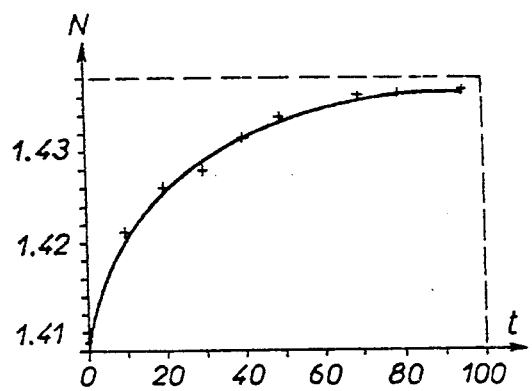
FIG. 3 is a diagram showing the corresponding evolution with time of the refractive index of the diffusing additive material.

The diagram in FIG. 3 shows the evolution of the refractive index N of the diffusing additive material 11 and therefore its composition as a function of the time t expressed in hours.

At the end of the diffusion period, after which the diffusing additive material 11 is totally absorbed by the base material 10, the polymerization of the latter is completed in situ by means of an appropriate cycle.

The result of this is a disk of optical quality synthetic material having a specific index gradient axially, parallel to the direction X.

Figure 4:
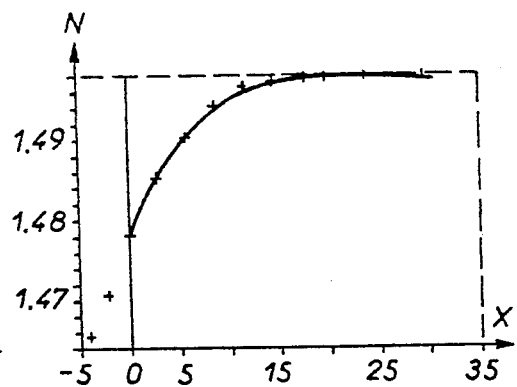
FIG. 4 is a diagram showing the index gradient profile obtained in the final polymer after diffusion of the additive material and subsequent polymerization of the whole.

FIG. 4 is a diagram showing the profile of this index gradient within this disk for a variation of the index of the diffusing additive material 11 corresponding to FIG. 3.

EXAMPLE 2

The initial partial polymerization of the CAD constituting the base material 10 is carried out in the presence of 4% TPE at 70° for 2 hours 30 minutes.

In all other respects the procedure is the same as already described.

Figure 5:
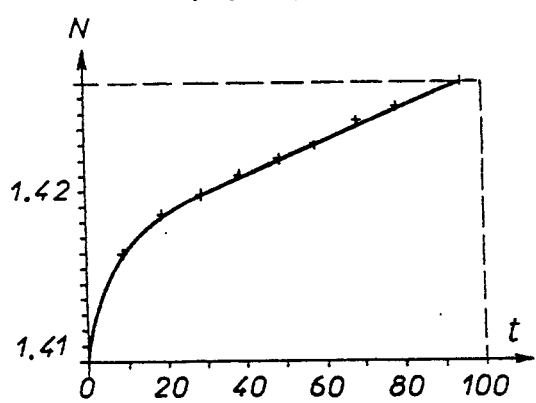
FIGS. 5 and 6 on the one hand and FIGS. 7 and 8 on the other hand are diagrams analogous to those of FIGS. 3 and 4 and relating to other embodiments of the invention.
Figure 6:
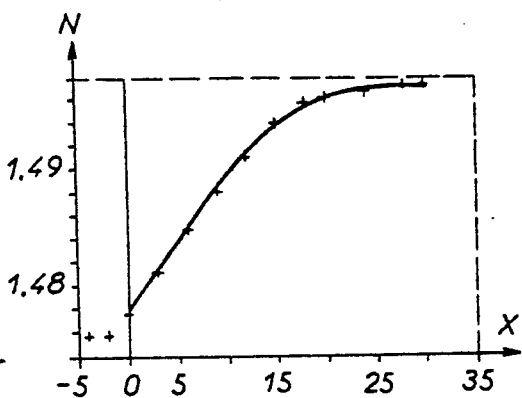

FIGS. 5 and 6 shows the corresponding diagrams.

EXAMPLE 3

The CAD constituting the base material 10 is started up as in example 2. However, the diffusing additional material 11 is initially formed totally of CAF.

Figure 7:
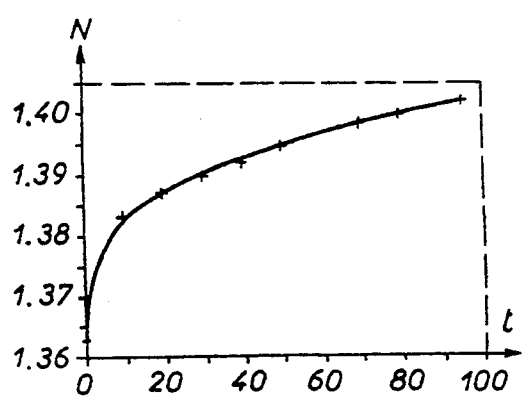
Figure 8:
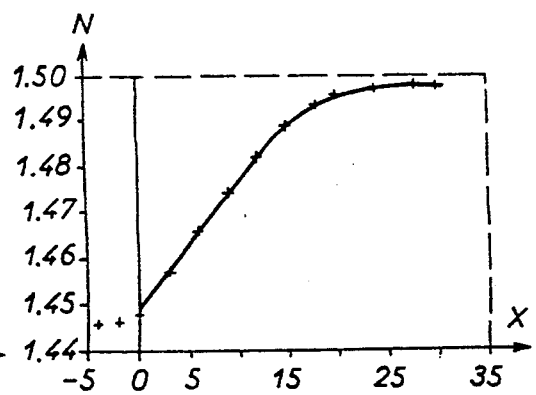

FIGS. 7 and 8 show the corresponding diagrams.

In the foregoing the diffusion is axial. It may also and advantageously be radial, however, from the periphery of the base material 10 in question towards its center.

Figure 9:
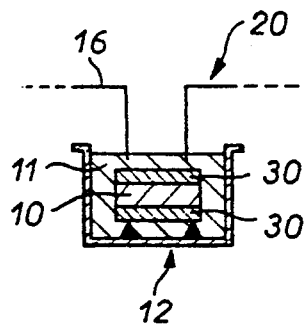
FIG. 9 repeats part of FIG. 1 for an alternative embodiment of the invention.

FIG. 9 shows by way of example an implementation specific to such radial diffusion.

In outline, the gel constituting the base material 10 is placed between two molds 30 each consisting of a glass slide, for example, and the whole is immersed in the diffusing additive material 11 in the container 12.

Of course, the present invention is not limited to the embodiments described and shown but encompasses any variant execution.

It must also be emphasised that the device described is merely an experimental device and is therefore open to numerous modifications.

There is claimed:

1. Method for producing a graded index polymer comprising the steps of providing a base material in a gel state comprising at least one partially polymerized monomer capable of yielding a homopolymer with a refractive index N1, providing at least two monomers each capable of yielding a homopolymer, at least one of said at least two monomers being different form the first-mentioned monomer, mixing said at least two monomers in proportions that are varied with time to yield an additive mixture having a refractive index N2 different form N1, and adding the additive mixture of said at least two monomers to said base material and allowing the additive mixture to diffuse into the base material, and thereafter completing the polymerization of the base material.

2. Method according to claim 1, further comprising monitoring the refractive index N2 of the additive mixture and varying the proportions of said at least two monomers to yield the addition mixture in accordance with a predetermined law based on the monitored refractive index N2 to obtain a required index gradient profile.

3. Method according to claim 1, wherein one of said at least two monomers is the first-mentioned monomer.

4. Method according to claim 1, wherein said at last one monomer is a single monomer, and one of said at least two monomers is the same as said single monomer.

5. Method according to claim 1, wherein the base material comprises diethylene glycol bis (allylcarbonate) and the additive material comprises a mixture of this monomer and 2,2,2-trifluoroethane allylcarbonate.

6. Method according to claim 1, wherein the step of providing a base material comprises effecting partial polymerization of the base material by free radical polymerization using an initiator selected from one of the group consisting of diisopropyl peroxycarbonate and tertbutyl 2-peroxyethylhexanoate.

7. Method according to claim 1, wherein the base and additive mixture are introduced selectively into a container, at least one of said at least two monomers being introduced by controlled injection.

8. Method according to claim 1, further comprising recycling the additive mixture from the container and removing samples from the recycled additive mixture for measuring the refractive index of the samples.

9. Method for producing a graded index polymer comprising the steps of:
   (a) providing a base material in a gel state comprising at least one partially polymerized monomer capable of yielding a homopolymer with a refractive index N1,
   (b) providing at least two monomers each capable of yielding a homopolymer, at least one of said at least two monomers being different from the first-mentioned monomer,
   (c) mixing said at least two monomers in predetermined initial proportion to yield an additive mixture having a refractive index N2 different from N1, and
   (d) adding the additive mixture of said at least two monomers to said base material and allowing the additive mixture to diffuse into the base material,
   (e) recycling the added additive mixture and varying the proportions of the at least two monomers in the additive mixture and again adding the mixture to the base material, and
   (f) thereafter completing the polymerization of the base material.

10. Method according to claim 9, further comprising monitoring the refractive index N2 of the additive mixture during the recycling of the additive mixture and varying the proportions of said at least two monomers to yield the addition mixture in accordance with a predetermined law based on the monitored refractive index N2, to obtain a required index gradient profile.

* * * * *